（12） United States Patent
Chao et al.

(10) Patent No.: US 8,395,592 B2
(45) Date of Patent: Mar. 12, 2013

(54) SENSING SYSTEM

(75) Inventors: Su-Hwa Chao, Taipei Hsien (TW);
Shang-Li Lee, Taipei (TW); Wei-Jen Tai, Taipei Hsien (TW)

(73) Assignees: Apex Material Technology Corp.,
Taipei Hsien (TW); Salt International Corp., Taipei (TW)

( * ) Notice: Subject to any disclaimer, the term of this patent is extended or adjusted under 35 U.S.C. 154(b) by 714 days.

(21) Appl. No.: 12/512,664

(22) Filed: Jul. 30, 2009

(65) Prior Publication Data

US 2010/0033440 A1   Feb. 11, 2010

(30) Foreign Application Priority Data

Aug. 5, 2008 (TW) .............................. 97129746 A
May 21, 2009 (TW) .............................. 98116957 A

(51) Int. Cl.
*G06F 3/041*   (2006.01)

(52) U.S. Cl. ........................................................ 345/173
(58) Field of Classification Search .................. 345/173
See application file for complete search history.

(56) References Cited

U.S. PATENT DOCUMENTS

| | | | |
|---|---|---|---|
| 5,245,139 A * | 9/1993 | Protheroe et al. .......... | 178/18.05 |
| 5,563,381 A * | 10/1996 | Crooks et al. .............. | 178/18.03 |
| 5,815,141 A | 9/1998 | Phares | |
| 6,020,945 A * | 2/2000 | Sawai et al. .................... | 349/119 |
| 2007/0024597 A1 * | 2/2007 | Matsuoka ..................... | 345/173 |

FOREIGN PATENT DOCUMENTS

EP   0631256 A2   12/1994

* cited by examiner

*Primary Examiner* — Quan-Zhen Wang
*Assistant Examiner* — Nelson D Runkle, III
(74) *Attorney, Agent, or Firm* — Volpe and Koenig, P.C.

(57) ABSTRACT

A sensing system is provided in the present application. The sensing system includes a plurality of input areas, by each of which an input is received and an input signal is generated; and a processing device electrically coupled with the each of the plurality of input areas and performing a validation criterion for determining a means processing the input signal.

17 Claims, 9 Drawing Sheets

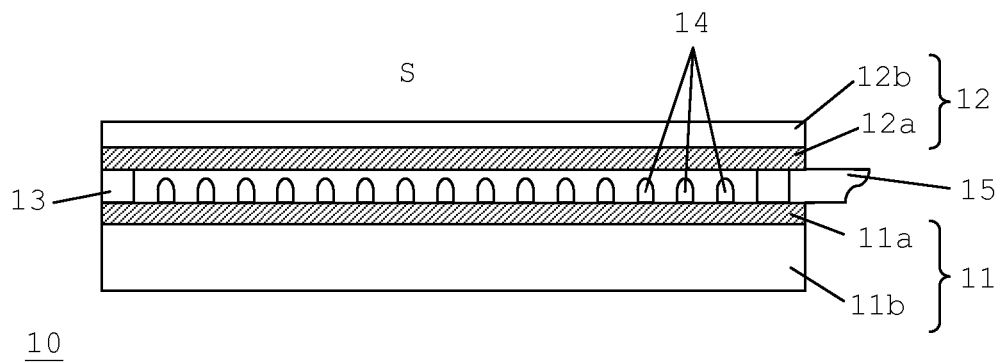
Fig. 1(A)    (Prior Art)
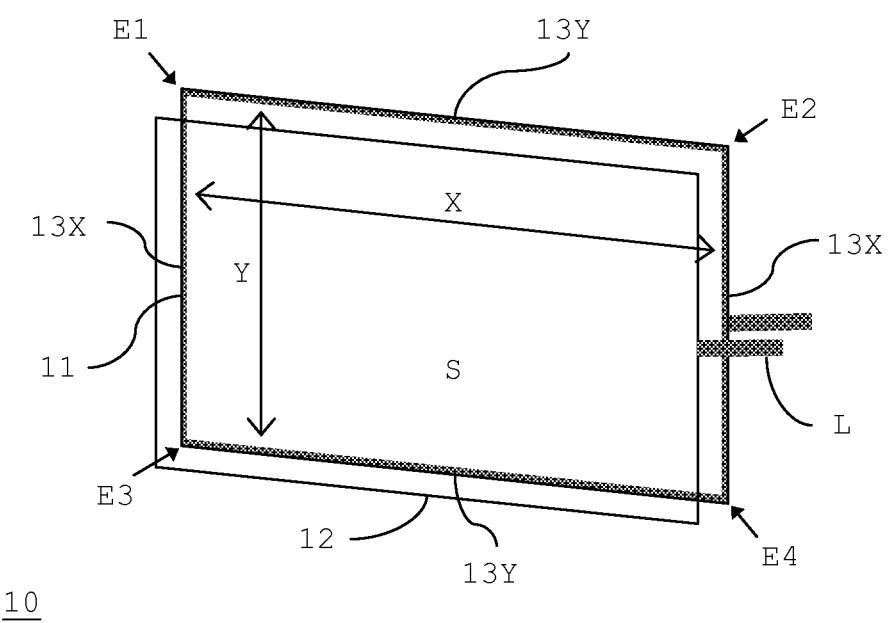
Fig. 1(B)    (Prior Art)

SENSING SYSTEM

FIELD OF THE INVENTION

The present invention relates to a sensing system, in particular, a touch-based sensing system.

BACKGROUND OF THE INVENTION

Owing to the rapid development of digital technology, all kinds of information equipment is promptly improved and various multimedia provide people abundant digital information. With such a tide of digitalization, the utilization of touch screens has already drawn a lot of attention from users. Beginning with PDAs (Personal Digital Assistants) and small-sized 3-inch LCD (Liquid Crystal Display) for cell phones to a medium-sized 10-inch LCD for industry equipment and business terminal products, the utilization scope of the touch screen has gradually extended to large-sized screens over 10-inches.

Please direct to FIG. 1(A), which is a cross-section diagram illustrating a conventional touch panel. The touch panel 10 shown in FIG. 1(A) mainly consists of a lower conductive layer 11, an upper conductive layer 12, a double side adhesive (DSA) 13 and a plurality of spacers 14. Usually the lower conductive layer 11 is a substrate 11b that is deposited or coated with a transparent conductive substance 11a being a Indium Tin Oxide (ITO), a Fluorine Tin Oxide (FTO), an Antimony Tin Oxide (ATO) or a carbonate thereon, wherein the substrate 11b is a Poly Carbonate (PC) substrate or a glass substrate. The upper conductive layer 12 is a substrate 12b that is deposited or coated with a transparent conductive substance 12a being a ITO, a FTO, an ATO or a carbonate thereon, wherein the substrate 12b is a Poly Ethylene Terephthalate (PET) made substrate.

The plurality of spacers 14 are sandwiched between the lower conductive layer 11 and the upper conductive layer 12 for separating the lower conductive layer 11 and the upper conductive layer 12. The lower conductive layer 11 and the upper conductive layer 12 are joined together with the double side adhesive 13. The surface above the upper conductive layer 12 is a touching surface S. A user can touch or press the touching surface S to render the lower conductive layer 11 and the upper conductive layer 12 to contact making an electrical connection.

Please further direct to FIG. 1(B), which is a diagram illustrating the work principle for a conventional touch panel. There are two pairs of electrodes 13X and 13Y located at the four edges of the lower conductive layer 11. The electrode 13X and the electrode 13X are located at the opposite side of the lower conductive layer 11 and parallel to each other and similarly the electrode 13Y and the electrode 13Y are located at the opposite side of the lower conductive layer 11 and parallel to each other. The pair of electrodes 13X and the pair of electrodes 13Y are perpendicular to each other. The circuit X consists of the pair of the electrodes 13X and vice versa the circuit Y consists of the pair of the electrodes 13Y.

First a +5 volt voltage potential is input from the points E1 and E3 of the lower conductive layer 11 so as to form a standard 5 volt voltage potential between circuit X from points E1, E3 to points E2, E4 and alternatively, a 5 volt voltage potential is then input from the points E1 and E2 of the lower conductive layer 11 so as to form a standard 5 volt voltage potential between circuit Y from points E1, E2 to points E3, E4. Once a user touches or presses any position on the touching surface S, where by the lower conductive layer 11 and the upper conductive layer 12 contact and the voltage at the contact point at the respective circuits X and Y are output from the signal line L of the upper conductive layer 12. The upper conductive layer 12 could thus probe/detect/inspect the voltage signal for the touched or pressed position at the respective circuits X and Y. Then the voltage potential is transformed into a digital format, so that the coordinate for the touched or pressed position is precisely obtained. Typically, an Alternating Current (AC) having a work frequency of 150 Hz, is sufficient for probing/detecting/inspecting the touched or pressed position at any position on the touching surface S of the touch panel 10.

However, it is apparent that the above-mentioned process could be only applied for detecting a single point touch event. As for a multi-touch event, it fails. Therefore there is a need for a multi-touch, touch panel to be invented. In reference with the U.S. Pat. No. 5,815,141 and Euro Patent No. EP 0 631 256 A2, these patents provide a multiple input area independent from each other so as to receive multiple touches simultaneously, even though, it is still insufficient for a multi-touch touch panel to deal with a multiple-touch event complicated with sophisticated gestures. Hence in order to overcome the mentioned drawbacks of the prior art, a novel sensing system for a multi-touch event thereof is provided.

SUMMARY OF THE INVENTION

In the present invention, a sensing system is capable to deal with a multiple-touch event and multiple-touch event the complicated with sophisticated gestures is provided. According to the first aspect of the present invention, a sensing system is provided. The sensing system includes a plurality of input areas, each of which receives an input and generates an input signal; and a processing device electrically coupled with the plurality of input areas and executing a validation criterion determining a mode processing the input signal.

Preferably, the processing device distinguishes the respective input signal coming from a specific one of the plurality of input areas from the respective input signals.

Preferably, the sensing system further includes a first layer having a first conductive layer; a second layer having a second conductive layer positioned oppositely toward the first conductive layer and is divided into the plurality of input areas insulated from one another wherein at least one of the plurality of input areas has a signal line; and a plurality of spacers sandwiched between the first conductive layer and the second conductive layer.

Preferably, the sensing system further includes a glass layer located above the second layer.

Preferably, the glass layer is located above the second layer by an optical adhesive being an optical clear adhesive.

Preferably, the sensing system further includes a polarizer disposed on one side of the second phase shift layer.

Preferably, the sensing system further includes a first phase shift layer disposed on one side of the first layer; and a second phase shift layer disposed on another side of the second layer.

Preferably, the input is a touch-based input and the input signal is a voltage signal.

Preferably, the processing device further includes a multiplexer having a plurality of input ends, a selecting end and an output end and electrically coupled with the plurality of input areas via the plurality of input ends, for receiving the respective input signals, and receiving a selecting signal via the selecting end for selectively outputting an analog signal accordingly.

Preferably, the processing device further includes an analog to digital converter electrically coupled with the output end of the multiplexer, receiving the analog signal and transforming the analog signal into a digital signal.

Preferably, the processing device further includes a micro control unit electrically coupled with the analog to digital converter, generating the selecting signal, performing the validation criterion and processing the digital signal with a first mode while the validation criterion is positive and processing the digital signal with a second mode while the validation criterion is negative.

Preferably, the processing device further includes a host end electrically coupled with the micro control unit.

Preferably, the plurality of input ends have a total number being one selected from a group consisting of being more than, equal to and less than a total number of the plurality of input areas.

Preferably, the plurality of input areas have respective shapes having a state being one selected from a group consisting of being exactly the same as one another, totally different from one another and partly the same as one another.

Preferably, the sensing system is one selected from a group consisting of a resistive touch panel, a transparent touch panel, a non-transparent touch panel and a semi-transparent touch panel.

According to the second aspect of the present invention, a sensing system is provided. The sensing system includes a processing device electrically coupled with a plurality of input areas, receiving an input signal from each of the plurality of input areas and performing a validation criterion determining a mode processing the input signal.

Preferably, the processing device distinguishes the respective input signal coming from a specific one of the plurality of input areas from the respective input signals.

According to the third aspect of the present invention, a sensing system is provided. The signal processing method for a sensing system having a plurality of areas includes steps of receiving at least one input signal from the plurality of areas; performing a validation criterion determining a mode processing the at least one input signal; and processing the at least one input signal with a first mode while the validation criterion is positive and processing the at least one input signal with a second mode while the validation criterion is negative.

Preferably, the signal processing method further includes steps of performing a judging criterion determining whether the input signal is received; and receiving the input signal while the judging criterion is positive and ceasing to receive the input signal while the judging criterion is negative.

Preferably, the signal processing method further includes a step of distinguishing the respective input signals from one another.

Preferably, the judging criterion further includes steps of determining whether a corresponding area of the input signal is one of an active area and non-active area; and determining the judging criterion as positive if the corresponding area is the active area and determining the judging criterion as negative if the corresponding area is the non-active area.

Preferably, the validation criterion further includes steps of calculating a present position of the input signal at a present time and a previous position of the input signal at a previous time; calculating a distance between the present position and the previous position; determining whether the distance is less than a threshold; and determining the validation criterion as positive if the distance is less than the threshold and determining the judging criterion as negative if the distance is one of two states of being larger than and equal to the threshold.

Preferably, the first mode is to draw a line between the present position and the previous position.

Preferably, the second mode is to execute functions respectively corresponding to the present position and the previous position.

The foregoing and other features and advantages of the present invention will be more clearly understood through the following descriptions with reference to the drawings:

BRIEF DESCRIPTION OF THE DRAWINGS

FIG. 1(A) is a cross-section diagram illustrating a conventional touch panel;

FIG. 1(B) is a diagram illustrating the work principle for a conventional touch panel;

DETAILED DESCRIPTION OF THE PREFERRED EMBODIMENT

The present invention will now be described more specifically with reference to the following embodiments. It is to be noted that the following descriptions of preferred embodiments of this invention are presented herein for the aspect of illustration and description only; it is not intended to be exhaustive or to be limited to the precise form disclosed.

Figure 2:
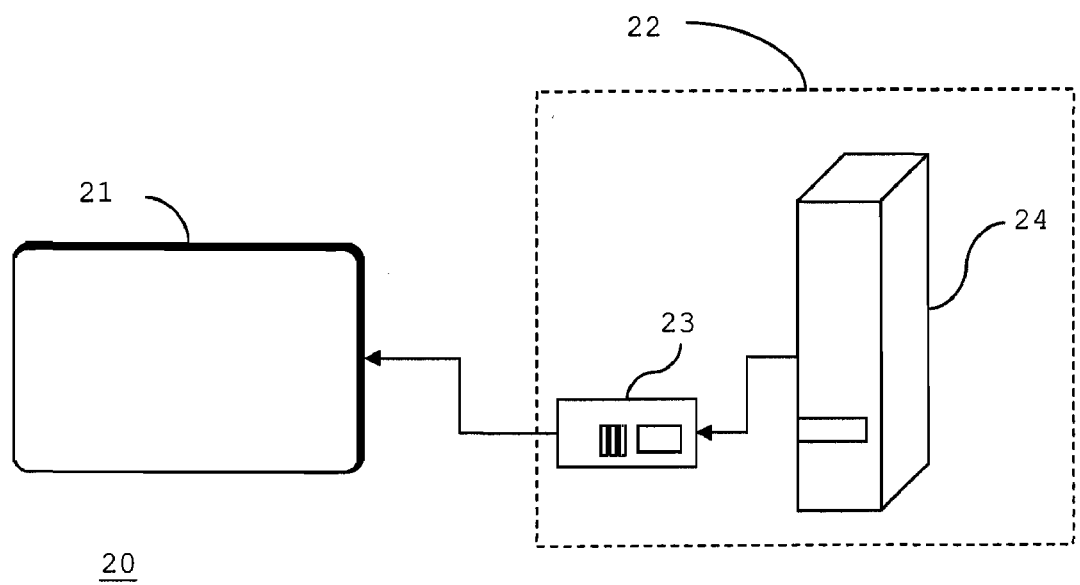
FIG. 2 is a diagram illustrating a sensing system according to the present invention.

Please refer to FIG. 2, which is a diagram illustrating a sensing system according to the present invention. The sensing system 20 according to the present invention mainly consists of a sensing device 21 and a processing device 22, wherein the processing device 22 includes an intermediary circuit 23 and a host end 24. The sensing device 21 is electrically coupled with the intermediary circuit 23 and the intermediary circuit 23 is electrically coupled with the host end 24.

Sensing Device

Figure 3A:
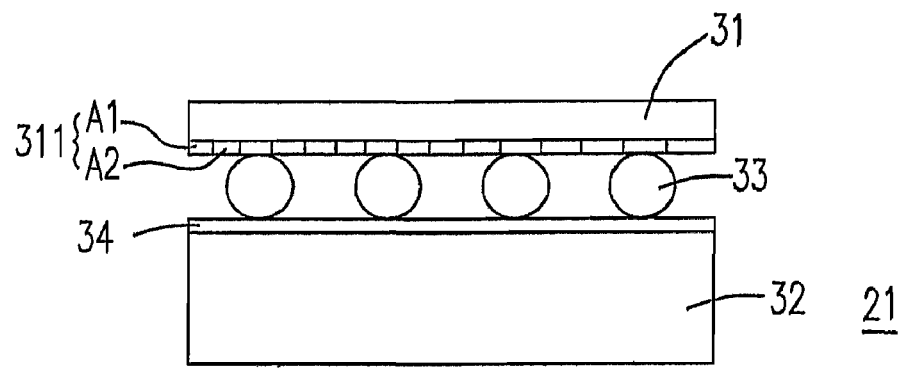
FIG. 3(A) is a lateral cross-section diagram illustrating the fundamental structures for the sensing device according to the present invention.
Figure 3B:
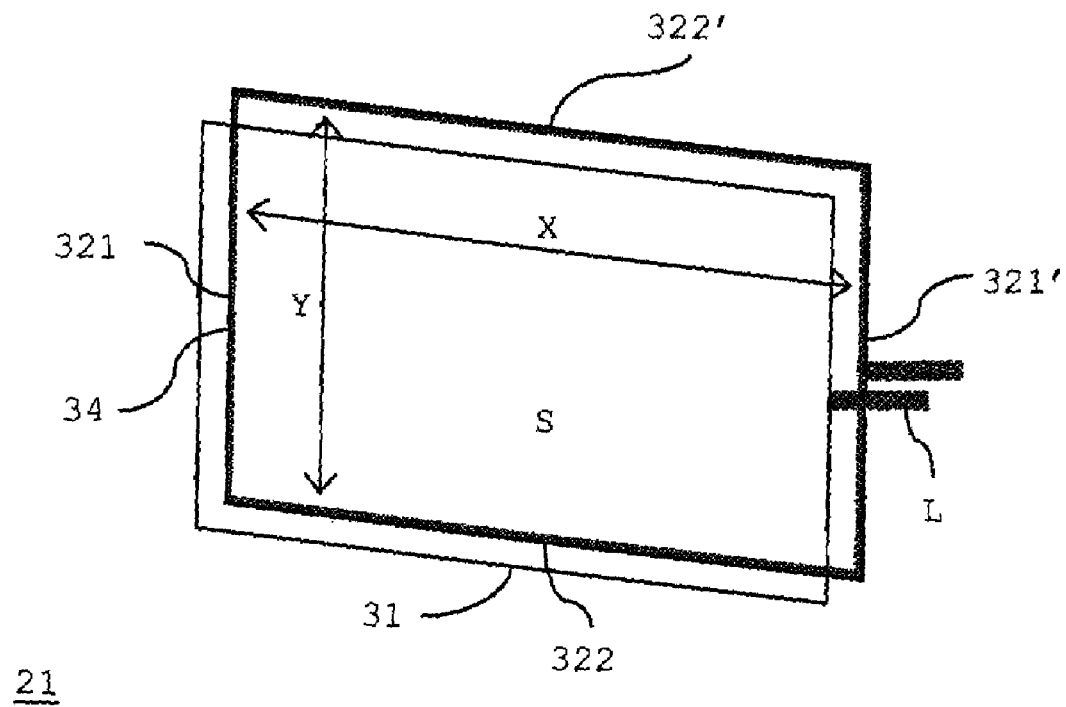
FIG. 3(B) is a perspective view diagram illustrating the fundamental structures for the sensing device according to the present invention.

Please refer to, FIGS. 3(A) and 3(B), which are respectively a cross-section view and a perspective view diagrams illustrating the fundamental structure for the sensing device according to the present invention. In FIG. 3(A), the sensing device 21 mainly includes a upper substrate 31, a lower substrate 32 and a plurality of spacers 33, wherein a first conductive layer 34 are deposited on the lower substrate 32 and a second conductive layer 311 that is divided into several conductive areas deposited on the upper substrate 31. Typically, the sensing device 21 is preferably a resistive touch panel, a transparent touch panel, a non-transparent touch panel or a semi-transparent touch panel Please refer to FIG. 3(B). The implementation in FIG. 3(B) is typically identical with that in FIG. 1(B). Namely the circuit X consisting of two electrodes 321 and 321' and the circuit Y consisting of two electrodes 322 and 322' are located around the first conductive layer 34, so that a voltage potential in a range form 1 volt to 10 volt, preferably a 5 volt voltage potential, is utilized for detecting touch-based inputs could be thus formed by the pair of the circuits X and Y.

Please keep referring to FIG. 3(A). The surface of the upper substrate 31 toward the first conductive layer 34 has a second conductive layer 311 disposed thereon. The second conductive layer 311 is divided into several conductive areas A1 and A2 that are insulated to each other, or namely a plurality of conductive areas A1 and A2 are separately deposited/formed on the second conductive layer 311. The plurality of the spacers 33 are sandwiched between the first conductive layer 34 and the second conductive layer 311 for separating the first conductive layer 34 and the second conductive layer 311.

Practically the second conductive layer 311 on the upper substrate 31 is divided into the plurality of the conductive areas A1 and A2 in accordance with the practical demands and at least one of the plurality of conductive areas has one signal line (not shown in FIG. 3(A)) so as to transmit a plurality of input signals generated from the plurality of conductive areas based on the touch-based inputs. Accordingly, when two or more points on the sensing device 21 are simultaneously touched or pressed, the conductive areas A1 and A2 of the second conductive layer 311 corresponding to the respective two touched points are simultaneously contacted with the first conductive layer 34 of the lower substrate 31 in the opposite side. At the moment, the circuits X and Y provides a voltage value to the respective input areas touched and contacted. The provided voltage values are then output to be further processed for determining which conductive areas have been touched or pressed utilizing the signal line, so that the points on the sensing device 21 simultaneously touched could be detected/inspected and the effect of detecting/inspecting a multi-touch input is thus achieved.

Please note that "at least one of the plurality of conductive areas have one signal line" includes the conditions that "every conductive areas of the plurality of areas have one signal line" or "some of the plurality of conductive areas have one signal line respectively". Besides, a number of signal lines connected with the plurality of areas is not limited which could be adjusted with respect to the practical demands.

The material made of the upper substrate 31 and the lower substrate 32 includes but not limited to PET, PC, glass and other material that could be used for manufacturing the transparent or non-transparent substrate. The material made of the first conductive layer 34 and the second conductive layer 311 includes but not limited to ITO, FTO, ATO, carbonate and other equivalent conductive material.

Figure 4A:
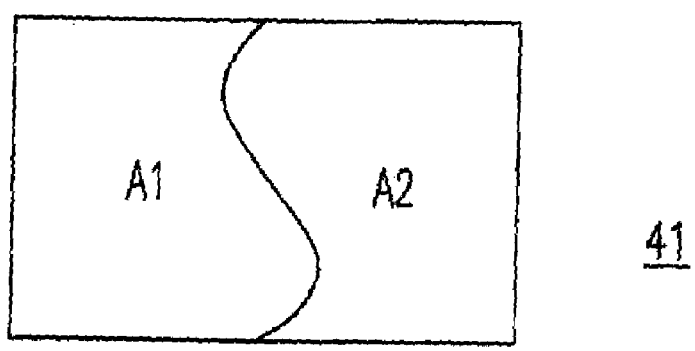
FIGS. 4(A)~(E) is a diagram illustrating different dividing types for a divided second conductive area according to the present invention.
Figure 4B:
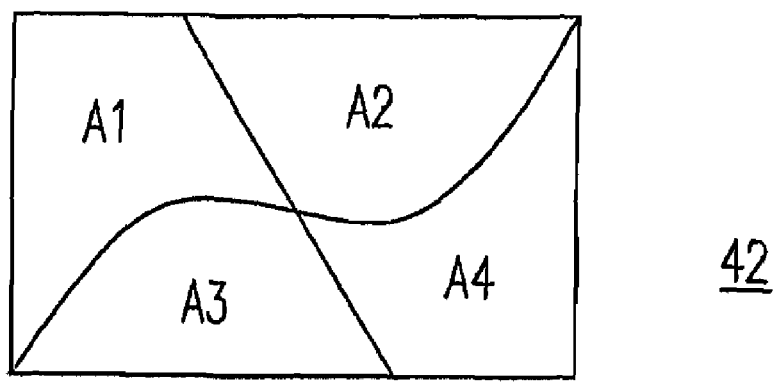
Figure 4C:
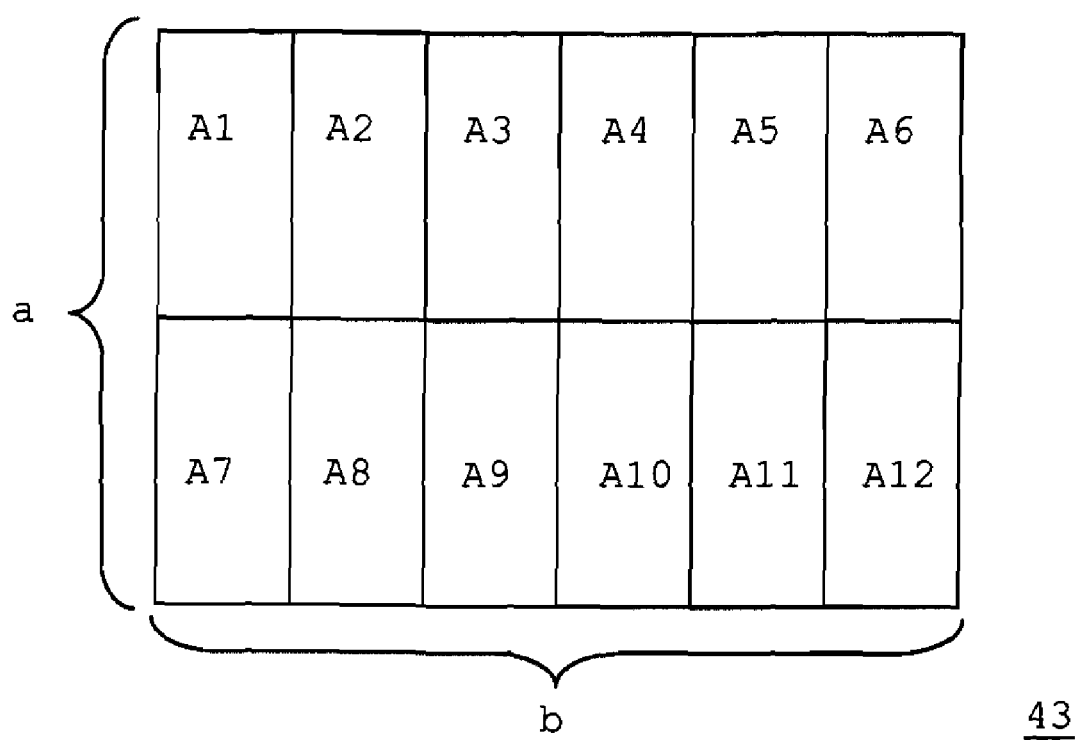

The respective conductive areas A1 and A2 have shapes that are exactly the same as one another, totally different from one another and partly the same as one another. For instance, the second conductive layer 41 as shown in FIG. 4(A) is divided into two conductive areas A1 and A2 having different shape to each other. Alternatively the second conductive layer 42 as shown in FIG. 4(B) could be divided into four conductive areas A1, A2, A3 and A4 having different shape to each other. Certainly, as what is shown in FIG. 4(C), the second conductive areas 43 could be divided into a×b areas A1 to A12 having the same shape to each other, e.g. a=2 and b=6.

Figure 4D:
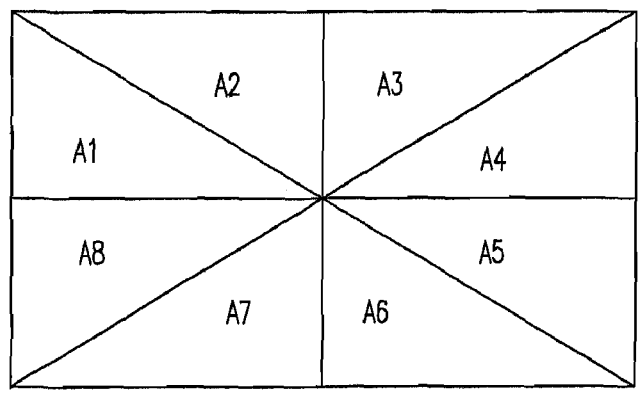
Figure 4E:
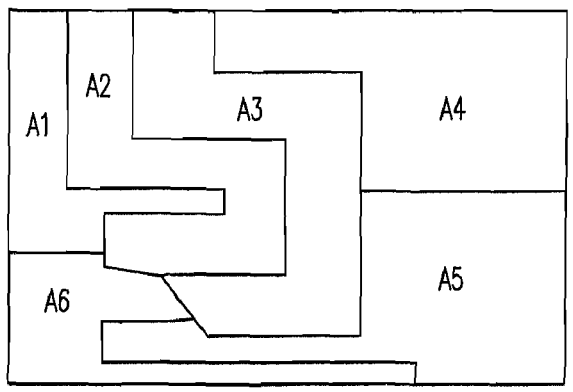

In addition to the above-mentioned three kinds of examples, a person skilled in the art can derive other varied shapes in accordance with the generic concept in the present invention. For instance, as shown in FIG. 4(D), the second conductive layer could be also divided into eight conductive areas A1 to A8 having a radiation-like shape to each other. Or as shown in FIG. 4(E), the second conductive layer is divided into conductive areas having different geometric shape and each of the conductive areas are still maintained connecting with the fringe of the second conductive layer.

Typically, as known to one skilled in the art that a number of the conductive areas are positively proportional to the resolution of the sensing device 21 though, the number and shape of the conductive areas are designed in accordance with the practical demands.

Figure 5:
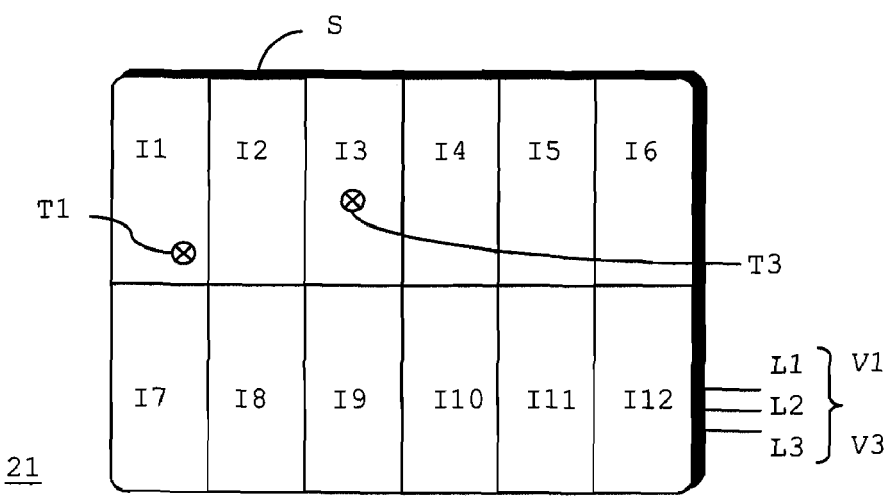
FIG. 5 is a diagram illustrating a touching surface of a sensing device according to the present invention.

Please refer to FIG. 5, which is a diagram illustrating a touching surface of a sensing device according to the present invention. The sensing device 21 having 12 conductive areas A1~A12 is taken as an example in FIG. 5. The upper substrate 31 having the second conductive layer 311 is under the touching surface S of the sensing device 21. Therefore the area upon the touching surface S corresponded to the respective conductive areas A1~A12 forms 2 input areas I1~I12, as shown in FIG. 5. One can simultaneously touch or press at least two of the input areas I1~I12. For instance, one can simultaneously touch the point T1 and T3 on the input areas I1 and I3 and the sensing device 21 will generate two corresponding input signals V1 and V3. The two corresponding input signals V1 and V3 are then transmitted and outputted through the signal line L1 and L3.

Figure 6A:
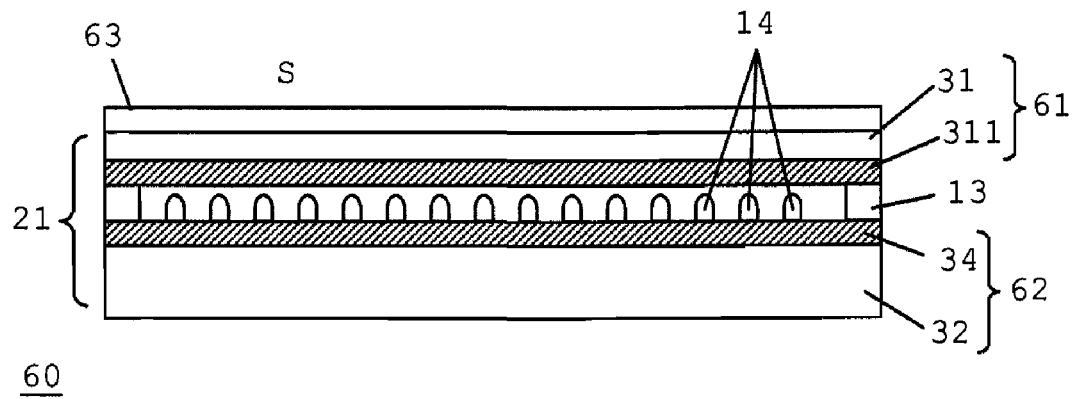
FIG. 6(A) is a lateral cross-section diagram illustrating the sensing device having a glass layer according to the present invention.

In order to enhance the durability to the touching surface of the above-mentioned sensing device 21, a transparent glass layer is additionally added to the surface of the sensing device. Please direct to FIG. 6(A), which is a lateral cross-section diagram illustrating the sensing device having glass layer according to the present invention. The enhanced sensing device 60 includes in FIG. 6(A) mainly includes a glass layer 63 and a sensing device 21. The sensing device 21 in FIG. 6(A) further includes an upper layer 61 consisting of an upper substrate 31 and a second conductive layer 311, a lower layer 62 consisting of a lower substrate 32 and a first conductive layer 34, DSA 13 and spacers 14.

The glass layer 63 is adhered to the upper layer 61 of the sensing device 21 by an optically clear adhesive (OCA). There is a touching surface S above the glass layer 63. The glass layer 63 is preferably a glass layer with anti-refection, anti-glare, anti-stain, anti-fog, anti-bacteria, anti-fingerprint or anti-ultraviolet coatings applied. An anti-ultraviolet layer (not shown in FIG. 6(A)) could be further sandwiched between the glass layer 63 and the upper layer 61, so as to further protect the upper substrate 31 made of PET material of the upper layer 61 from the damage by ultraviolet light. The anti-ultraviolet layer is preferably a triacetyl cellulose (TAC) film or a polarizer film. Preferably, a protecting layer (not shown in FIG. 6(A)) could be further added to the top of the glass layer 63.

Figure 6B:
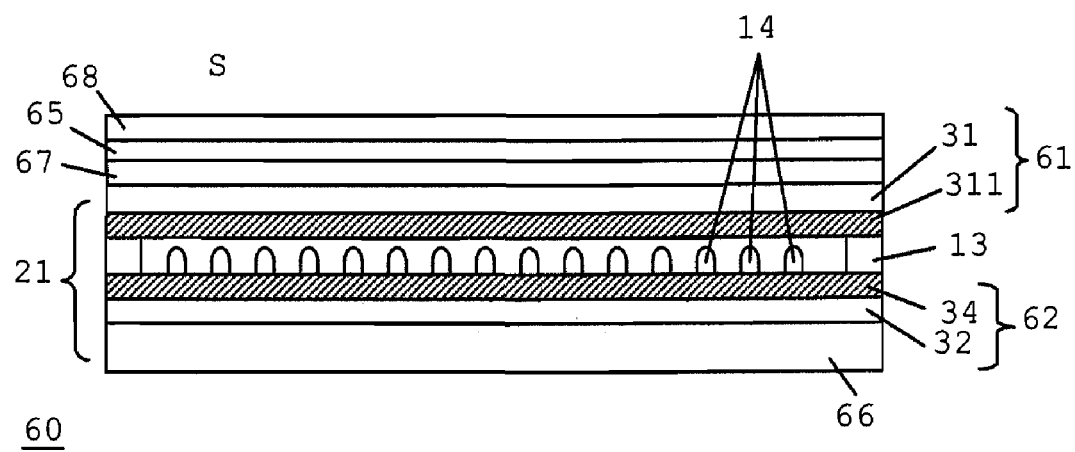
FIG. 6(B) is a lateral cross-section diagram illustrating the sensing device having a polarizer and a phase shift layer according to the present invention.

In order to reduce the reflection phenomena which occurs at the touching surface S to the above-mentioned sensing device 21, a polarizer and a plurality of phase shift layer is additionally deposited/applied with the sensing device 21. Please direct to FIG. 6(B), which is a lateral cross-section diagram illustrating the sensing device having polarizer and phase shift layer according to the present invention. The enhanced sensing device 60 includes in FIG. 6(B) mainly includes an upper layer 61 consisting of an upper substrate 31 and a second conductive layer 311, a lower layer 62 consisting of a lower substrate 32 and a first conductive layer 34, a polarizer 65, a first phase shift layer 66, a second phase shift layer 67 and an option layer 68.

The first phase shift layer 66 is fixed at the lower side of the lower substrate 32 of the lower layer 62 and the second phase shift layer 67 is fixed at the upper side of the upper substrate 31 of the upper layer 61. The polarizer 65 is fixed above the second phase shift layer 67. The first phase shift layer 66 and the second phase shift layer 67 are ¼λ phase shift films and preferably made by materials selected from a group consisting of a PC, an ARTON, a Polyethersulfone (PES), a ZEONOR, a TAC and a combination thereof. It is noted that the second phase shift layer 67 dispensable meaning that it is could be neglected at certain circumstances while the first phase shift layer 66 is able to provide sufficient capability to reduce the reflection at touching surface S. The selection layer 68 is a layer selected from one of the glass layer 63 and a protecting layer which is selectively located above the polarizer 65 in accordance with the practical demands.

Intermediary Circuit and Host End

Figure 7A:
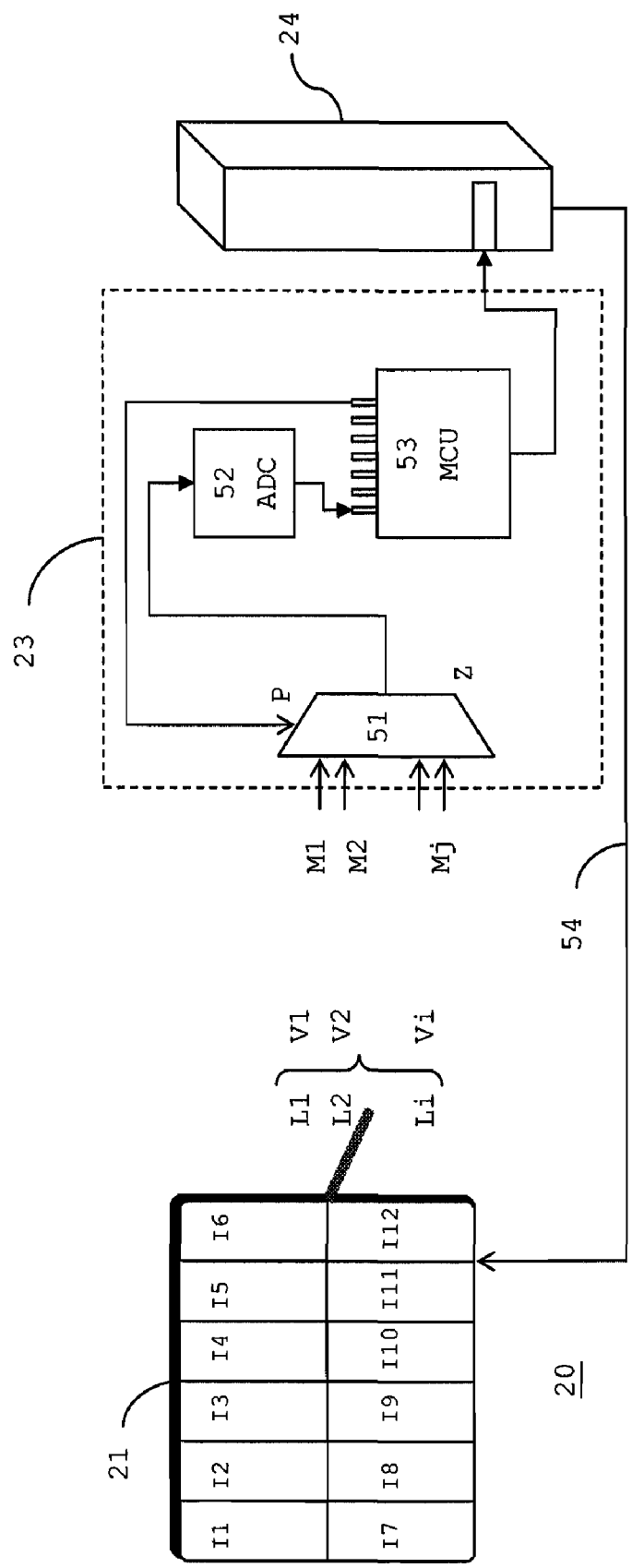
FIG. 7(A) is a diagram illustrating the first preferable embodiment for the intermediary circuit of the sensing system according to the present invention.

Please refer to FIG. 7(A), which is a diagram illustrating the first preferable embodiment for the intermediary circuit of the sensing system according to the present invention. The sensing system 20 mainly includes a sensing device 21, an intermediary circuit 23 and a host end 24. The intermediary circuit 23 includes a multiplexer 51, an analogy to digital converter (ADC) 52 and a micro control unit (MCU) 53, wherein the MCU 53 is a firmware where a plurality of predetermined criterions including a validation criterion and a judging criterion are pre-recorded therein.

The multiplexer 51 of the intermediary circuit 23 has a plurality of input ends M1~Mj, a selecting end P and an output end Z. The multiplexer 51 is electrically coupled with the signal lines L1~Li of the sensing device 21 by the plurality of input ends M1~Mj. In the present first preferable embodiment, since the sensing device 21 has 12 input areas I1~I12, a number of the signal lines L1~Li is correspondingly i=12. It is pre-set that a number of the input ends M1~Mj is equal to the number of the input areas I1~I12. Therefore, the number of the input ends M1~Mj is correspondingly j=12. However, it is noted that the number of the plurality of input ends is not limited to be equal to the number of the plurality of input areas. The plurality of input ends have a total number being one selected from a group consisting of being more than, equal to and less than a total number of the plurality of input areas, which is selectively depended from the practical demand.

The multiplexer 51 receives a selecting signal SS from the MCU 53 by the selecting end P and determines which voltage signals V1~Vi from the input ends M1~Mj are outputted to the output end Z and the sequence to output the voltage signals V1~Vi in accordance with a command included in the selecting signal SS. Then the multiplexer 51 transmits/outputs the voltage signal V1~Vi to the ADC 52 through the output end Z in the determined sequence.

While two or more places on the touching surface S of the input areas I1~I12 of the sensing device 21 are touched or pressed, e.g. the input areas I1 and I2 are simultaneously touched, the first and second conductive layers in the sensing device 21 will be conducted so that the voltage signals V1 and V2 being analogy signals are simultaneously generated by the sensing device 21 accordingly. Then the voltage signals V1 and V2 generated by the sensing device 21 are transmitted to the corresponding input ends M1 and M2 of the multiplexer 51 through the corresponding signal lines L1 and L2. While the respective input ends M1 and M2 receive the voltage signals V1 and V2 from the signal lines L1 and L2, the multiplexer 51 determines the sequence to output the voltage signals V1 and V2 in accordance with the selecting signal SS, wherein the selecting signal SS is provided by the MCU 53 or the host end 24. in the present first preferable embodiment, the voltage signal V1 is transmitted to the output end Z prior to the voltage signal V2 in accordance with the selecting signal SS. That is the voltage signals V1 and V2 are sequentially transmitted/output to the ADC 52 to be further processed through the output end Z.

After receiving voltage signals V1 and V2, the ADC 52 transforms the analogy voltage signals V1 and V2 into digital signals DS1 and DS2 including multiple bits information, e.g. an eight bits digital signal, in accordance with the pre-determined resolution. Then the ADC 52 further transmits the digital signals DS1 and DS2 to the MCU 53. The resolution of the ADC 52 is preferably in the range from 1024 to 4096 or better. After receiving digital signals DS1 and DS2, the MCU 53 will process the received digital signals DS1 and DS2 in accordance with the predetermined criterions including the validation criterion and judging criterion pre-recorded therein.

The intermediary circuit 23 includes one multiplexer 51 and one ADC 52 only, which means that the intermediary circuit 23 in FIG. 7(A) could be only cooperated with the sensing device 21 having at most 12 input areas I1~I12, since the multiplexer 51 has only 12 input ends M1~M12. Once the number of input areas of the sensing device 21 is greater than 12, the intermediary circuit 23 has merely one multiplexer 51 is not compatible with the sensing device 21.

Figure 7B:
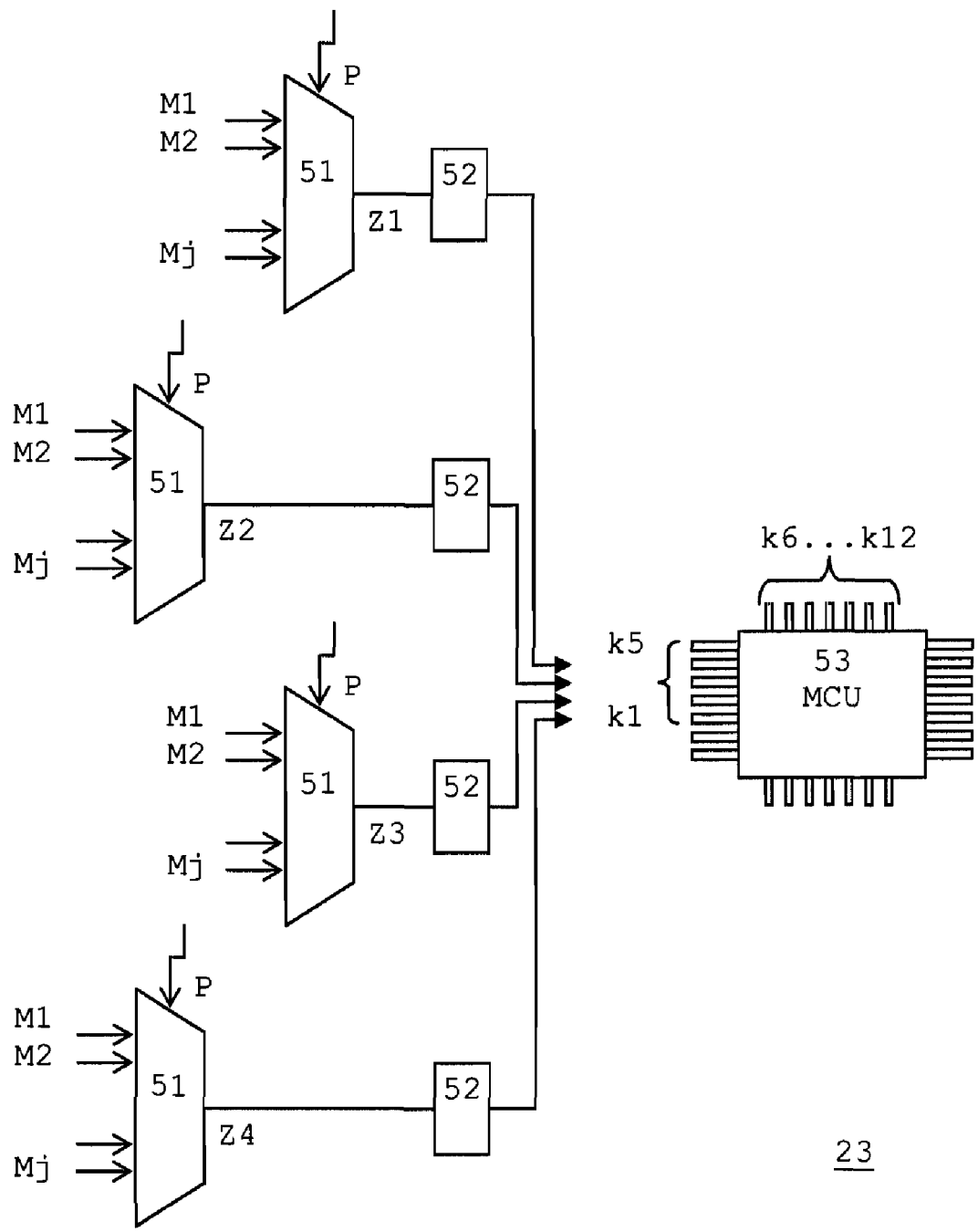
FIG. 7(B) is a diagram illustrating the multiplexer circuit according to the present invention.

Please refer to FIG. 7(B), which is a diagram illustrating the multiplexer circuit according to the present invention. The intermediary circuit 23 in FIG. 7(B) has multiple multiplexers 51 and the respective multiplexers 51 are corresponded with an ADC 52. The MCU 53 in FIG. 7(B) has total twelve input port k1~k12 which can receive twelve signals at most from different respective multiplexers 51. Accordingly, the intermediary circuit 23 in FIG. 7(B) could process up to 12×12=144 voltage signals from the sensing device 21, which means that the intermediary circuit 23 in FIG. 7(B) could be cooperated with the sensing device 21 having numbers of input areas I1~I144 up to 144.

For instance, in accordance with FIG. 7(B), since there are 4 multiplexers 51 and the respective multiplexers 51 has twelve input ends, the intermediary circuit 23 could process 4×12=48 voltage signals from the sensing device 21, which means that the intermediary circuit 23 in FIG. 7(B) could be cooperated with the sensing device 21 having at most 48 input areas I1~I48.

By the same token, the intermediary circuit 23 could operate with the sensing device 21 has multiple input areas far more than 144 as long as the MCU 53 with higher performance (with more input ports) and more multiplexers are adopted and operate in the intermediary circuit 23. The sensing device 21 having more input areas has higher resolution capability.

Figure 8:
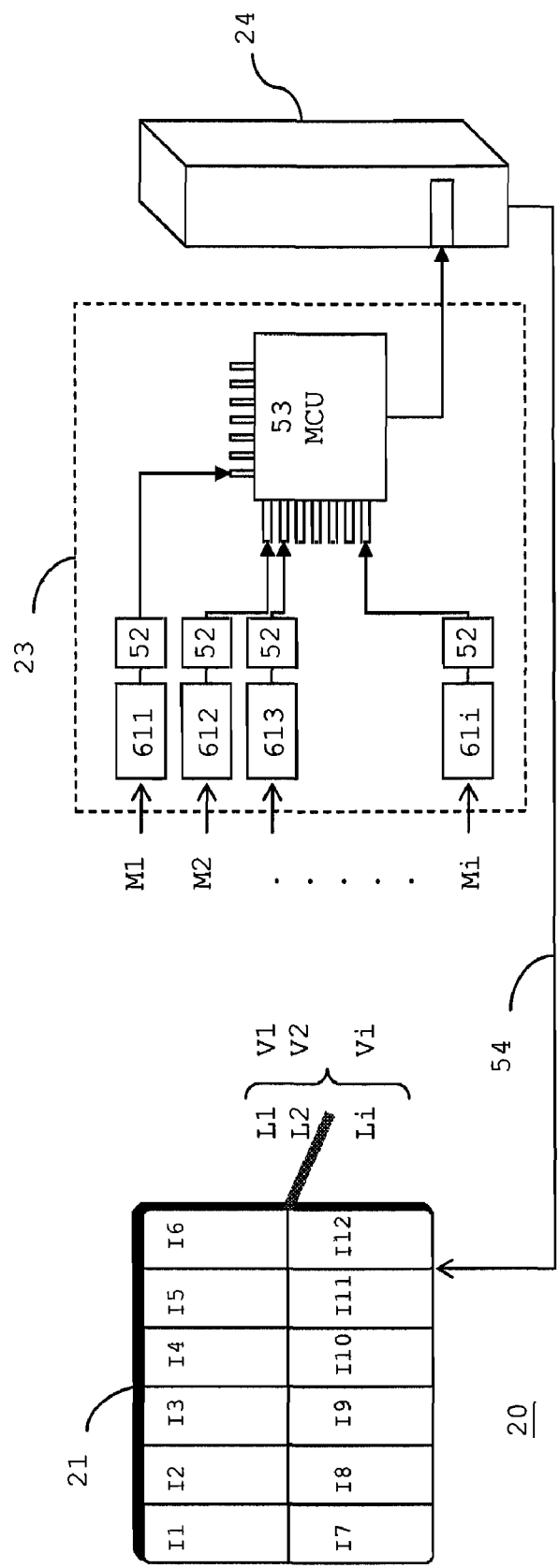
FIG. 8 is a diagram illustrating the second preferable embodiment for the intermediary circuit of the sensing system according to the present invention.

Please keep referring to FIG. 8, which is a diagram illustrating the second preferable embodiment for the intermediary circuit of the sensing system according to the present invention. On the basis of the first preferable embodiment, the intermediary circuit 23 has multiplexers 51, ADC 52 and MCU 53. However the second preferable embodiment for the intermediary circuit 23 has multiple reading units 611~61i instead of the multiplexers 51. The multiplexer 51 is built in the MCU 53. That is the MCU 53 will perform the selection and determine the sequence of the signals.

The intermediary circuit 23 in FIG. 8 includes multiple reading units 611~61i, multiple ADC 52 and MCU 53, wherein the respective signal lines L1~Li of the sensing device 21 are corresponded to one reading unit of reading units 611~61i. That is each of the reading units 611~61i are electrically connected with the respective signal lines L1~Li and each of the reading units 611~61i are corresponded to an ADC 52. Each of the ADCs 52 are electrically connected with the respective reading units 611~61i. The reading units 611~61i are preferably a filter. The MCU 53 is a firmware where several predetermined criterions including a validation criterion and a judging criterion are pre-recorded therein.

While two or more places on the touching surface S of the input areas I1~I12 of the sensing device 21 are touched or pressed, e.g. the input areas I1 and I2 are simultaneously touched, the first and second conductive layers in the sensing device 21 will be contacted so that the voltage signals V1 and V2 being analog signals are simultaneously generated by the sensing device 21 accordingly. Then the voltage signals V1 and V2 generated by the sensing device 21 are transmitted to the corresponding reading units 611 and 612 through the corresponding signal lines L1 and L2. While the respective reading units 611 and 612 receive and filter the voltage signals V1 and V2, the filtered voltage signals V1 and V2 are transmitted to the ADCs 52. The ADCs 52 transforms the analog voltage signals V1 and V2 into digital signals DS1 and DS2 including multiple bits information in accordance with the pre-determined resolution. Then the ADC 52 further transmits the digital signals DS1 and DS2 to the MCU 53. After receiving digital signals DS1 and DS2, the MCU 53 will process the multiplexing for the digital signals DS1 and DS2 and further process the multiplexed digital signals DS1 and DS2 in accordance with the predetermined criterions including the validation criterion and judging criterion pre-recorded therein. It is noted that since the MCU 53 takes the function of the multiplexer 51, the selecting and ordering of the digital signals DS1 and DS2 would be performed in the MCU 53. Thus the use of multiplexer 51 could be avoided in the present second preferable embodiment.

The host end 24 in the present invention is preferably a electronic computing device having a central processing unit (CPU), such as personal computer, a notebook computer, a handheld device, a sever or a workstation. The host end 24 provides power to the sensing device 21 through the power supply wire 54 to drive the sensing device generating the X, Y direction voltage potential. A driver program installed in the CPU of the host end 24 will coordinate with the predetermined criterions pre-recorded in the MCU 53, so that a user can control the host end 24 by inputting a touch-based input to the sensing device 21.

Signal Processing Method

The intermediary circuit 23 and the host end 24 according to the present invention will process the voltage signals V1~Vi from the sensing device 21 in accordance with the signal processing method as follows. The signal processing method is pre-recorded in the firmware namely MCU 53 or installed as a driver program in the CPU of the host end 24.

Please again referring to FIGS. 7(A) and 7(B), the sensing system 20 therein has one sensing device 21 having twelve input areas I1~I12, one multiplexer 51, one ADC 52 and one MCU 53 and a user presses or touches the point T1 and T3 corresponding to the input areas I1 and I3. The signal processing method according to the present invention for the above-mentioned scenario is introduced as follows.

At step 700, the rate per second that the multiplexer 51 scans the input areas I1~I12 is first set. Usually the working frequency of the multiplexer 51 is set in a range from 133 Hz to 150 Hz. In the present embodiment, a working frequency 150 Hz is adopted. That is the multiplexer 51 will scan the input areas I1~I12 of the sensing device 21 by 150 times per second periodically. The scanning sequence of the multiplexer 51 is from input area I1 to I6 to I12 to I7 and at the same time multiplexer 51 detects whether the plurality input ends M1~M12 receive voltage signals V1~V12 or not.

At step 701, a user simultaneously touches or presses the point T1 corresponding to the input area I1 and the point T3 corresponding to the input area I3. At step 702, the multiplexer 51 receives the voltage signal V1 and V3 sequentially, since according to the scanning sequence, the voltage signal V1 corresponding to the point T1 is detected prior to the voltage signal V3 corresponding to the point T3, that is the multiplexer receives the voltage signal V1 at the previous time t−1 and the voltage V3 at the current time t.

At step 703, the multiplexer 51 determines which voltage signal V1 and V3 from the input ends M1 and M3 are output to the output end Z and the sequence to output the voltage signals V1 and V3 in accordance with the selecting signal SS. The selecting signal SS is generated by the judging criterion from the MCU 53 or the host end 24. The judging criterion is used for determining whether the respective input areas I1 and I3 to which the voltage signals V1 and V3 respectively correspond to are an active area or a non-active area. If the input area I1 or I3 is an active area, then the corresponding voltage signal V1 or V3 is output to the output end Z and the next step 704 is consequently performed. If the input area I1 or I3 is a non-active area, then the corresponding voltage signal V1 or V3 is not output to the output end Z and the previous step 701 is consequently performed. In the present embodiment, the input area I1 and I3 are the active area.

At step 704, multiplexer 51 transmits/outputs the voltage signals V1 or V3 being the analog signal to the ADC 52 through the output end Z in the determined sequence. The ADC 52 will transform the analog voltage signals V1 and V3 into digital signals DS1 and DS3 including multiple bits of information, so that the coordinates (x,y) of the points T1 and T3 on the touching surface S of the sensing device 21 could be thus obtained. The resolution of the ADC 52 is preferably in the range from 1024 to 4096 or better. Then the digital signals DS1 and DS3 containing the information regarding the coordinates (x,y) of the points T1 and T3 are transmitted to the MCU 53.

At step 705, MCU 53 compares the coordinates Ct(x, y) of the points T1 from input area I1 at the current time t with the coordinates Ct−1(x, y) of the points T3 from input area I3 at the current time t−1 in accordance with the validation criterion pre-recorded in the MCU 53. The validation criterion is to calculate the straight line distance between the coordinates Ct(x, y) of the points T1 from input area I1 at the current time t and the coordinates Ct−1(x, y) of the points T3 from input area I3 at the current time t−1 and to determine whether the straight line distance is smaller than the threshold. If the distance is not smaller than the threshold, the step 706 is consequently performed. If the distance is smaller than the threshold, the step 707 is consequently performed.

At step 706, while the distance is not smaller than the threshold, the MCU 53 transmits a response signal to the host end 24 for requesting the host end 24 to activate the function to which the respective input areas I1 and I3 corresponded. At step 707, while the distance is smaller than the threshold, the MCU 53 transmits a response signal to the host end 24 for request the host end 24 to draw a straight line between the points T1 and point T3.

According to the above-mentioned signal processing method, the sensing system 20 according to the present invention is operated in accordance with the predetermined criterions including the validation criterion and judging criterion pre-recorded in the MCU 53 or the CPU of the host end 24. Accordingly, the present sensing system owns advantages at least as follows.

(1) A touching surface of a sensing device could be divided into multiple input areas, each of which is independent from each other. The respective input areas are able to perform independent touch identification.

(2) The sensing system could control the different respective input areas so as to achieve the multi-touch function.

(3) The input areas are able to be pre-defined as an "active area" or a "non-active area". By a combination of the active area and the non-active area, more possibly novel activation methods for the sensing device are accordingly generated.

(4) More predetermined criterions could be incorporated into the present sensing system so as to further link the input areas or to combine the respective separated input areas as an integrated touch panel. The linked or combined touch panel will act as a conventional touch panel.

(5) An "active area" or a "non-active area" could be dynamically assigned to an input area in accordance with the practical demands. A more practical layout for the input areas of the sensing device is thus available.

(6) A calculation for one input area to obtain the coordinate of the touching point is available.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims that are to be accorded with the broadest interpretation, so as to encompass all such modifications and similar structures. Accordingly, the invention is not limited by the disclosure, but instead its scope is to be determined entirely by reference to the following claims.

What is claimed is:

1. A sensing system, comprising:
   a plurality of input areas, arranged on a display device, receiving a first input on a first point at a current time and a second input on a second point at a previous time and generating input signals accordingly; and
   a processing device comprising:
      a multiplexer having a plurality of input ends, a selecting end and an output end and electrically coupled with the plurality of input areas via the plurality of input ends, for receiving the respective input signals, and receiving a selecting signal via the selecting end for selectively outputting an analog signal accordingly;
      an analog to digital converter electrically coupled with the output end of the multiplexer, receiving the analog signal and transforming the analog signal into a digital signal; and
   a micro control unit electrically coupled with the analog to digital converter and generating the selecting signal, in which the micro control unit is electrically coupled with the plurality of input areas and executing a validation criterion comprising a first mode and a second mode by which the micro control unit calculates an absolute distance between the first point and the second point and performs the first mode to activate the input areas on which the first and the second points are respectively situated as active areas if the absolute distance is not smaller than a threshold and performs the second mode to draw a straight line between the first and the second points on the display device if the absolute distance is smaller than the threshold.

2. The sensing system according to claim 1, wherein the processing device distinguishes the respective input signal coming from a specific one of the plurality of input areas from the respective input signals.

3. The sensing system according to claim 1, further comprising:
   a first layer having a first conductive layer;
   a second layer having a second conductive layer positioned oppositely toward the first conductive layer and is divided into the plurality of input areas insulated from one another wherein at least one of the plurality of input areas has a signal line; and
   a plurality of spacers sandwiched between the first conductive layer and the second conductive layer.

4. The sensing system according to claim 3, further comprising:
   a glass layer located above the second layer.

5. The sensing system according to claim 4, wherein the glass layer is located above the second layer by an optical adhesive being an optical clear adhesive.

6. The sensing system according to claim 3, further comprising:
   a polarizer disposed on one side of the second layer.

7. The sensing system according to claim 6, further comprising:
   a first phase shift layer disposed on one side of the first layer; and
   a second phase shift layer disposed on another side of the second layer.

8. The sensing system according to claim 1, wherein the first and the second inputs are a touch-based input and the input signal is a voltage signal.

9. The sensing system according to claim 1, wherein the processing device further comprises a host end electrically coupled with the micro control unit.

10. The sensing system according to claim 1, wherein the plurality of input ends have a total number being one selected from a group consisting of being more than, equal to and less than a total number of the plurality of input areas.

11. The sensing system according to claim 1, wherein the plurality of input areas have respective shapes having a state being one selected from a group consisting of being exactly the same as one another, totally different from one another and partly the same as one another.

12. The sensing system according to claim 1 being one selected from a group consisting of a resistive touch panel, a transparent touch panel, a non-transparent touch panel and a semi-transparent touch panel.

13. A sensing system, comprising:
   a processing device comprising:
      a multiplexer having a plurality of input ends, a selecting end and an output end and electrically coupled with the plurality of input areas via the plurality of input ends, for receiving the respective input signals, and receiving a selecting signal via the selecting end for selectively outputting an analog signal accordingly;
      an analog to digital converter electrically coupled with the output end of the multiplexer, receiving the analog signal and transforming the analog signal into a digital signal; and
   a micro control unit electrically coupled with the analog to digital converter and generating the selecting signal, in which the micro control unit is electrically coupled with a plurality of input areas, receiving a first input signal on a first point at a current time and a second input signal on a second point at a previous time from the plurality of input areas and performing a validation criterion comprising a first mode and a second mode by which the processing device calculates an absolute distance between the first point and the second point and performs the first mode to activate the input areas on which the first and the second points are respectively situated as active areas if the absolute distance is not smaller than a threshold and performs the second mode to draw a straight line between the first and the second points if the absolute distance is smaller than the threshold.

14. The sensing system according to claim 13, wherein the processing device distinguishes the respective input signal coming from a specific one of the plurality of input areas from the respective input signals.

15. A signal processing method for commanding a sensing system having a plurality of areas arranged on a display device, comprising steps of:

receiving a first input signal on a first point from one of the plurality of areas at a current time and a second input signal on a second point from the other one of the plurality of areas at a previous time;

calculating an absolute distance between the first point and the second point;

processing a first mode to activate the input areas on which the first and the second points are respectively situated as active areas if the absolute distance is not smaller than a threshold;

processing a second mode to draw a straight line between the first and the second points on the display device if the absolute distance is smaller than the threshold;

performing a judging criterion determining whether the input signal is received; and receiving the input signal while the judging criterion is positive and ceasing to receive the input signal while the judging criterion is negative.

16. The signal processing method according to claim 15, wherein performing the judging criterion further comprises steps of:

determining whether a corresponding area of the input signal is one of an active area and non-active area; and determining the judging criterion as positive if the corresponding area is the active area and determining the judging criterion as negative if the corresponding area is the non-active area.

17. The signal processing method according to claim 15, further comprising a step of distinguishing the respective input signals from one another.

* * * * *